No. 771,183. Patented September 27, 1904.

UNITED STATES PATENT OFFICE.

PAUL STEENBOCK, OF DEUTSCH WILMERSDORF, GERMANY.

PROCESS OF MANUFACTURING MATERIAL DESIGNED FOR THE PRODUCTION OF CEMENT.

SPECIFICATION forming part of Letters Patent No. 771,183, dated September 27, 1904.

Application filed June 22, 1904. Serial No. 213,722. (No specimens.)

*To all whom it may concern:*

Be it known that I, PAUL STEENBOCK, a subject of the King of Prussia, Emperor of Germany, residing at 135 Uhlandstrasse, Deutsch Wilmersdorf, near Berlin, in the Kingdom of Prussia and Empire of Germany, have invented a new and useful Improved Process of Manufacturing a Material Designed for the Production of Cement, of which the following is a specification.

My invention relates to the manufacture of a material which on being triturated with phosphoric acids or dissolved acid salts of the same hardens to form a vitreous cement which is adapted to be used for plugging teeth, for cementing porcelain, and the like. This material is manufactured by mixing beryllium compounds which are difficultly soluble in water and which react with phosphoric acids or their acid salts or are decomposable by them with similar compounds of the other light metals, including zinc, if required, with addition of coloring-matters. Compounds of the before-mentioned kind are the oxids, basic phosphates, borates, and silicates, also fluorids of each of the before-mentioned metals alone or corresponding double salts of several of them.

The well-known cements manufactured by the cold method are, as regards their structure, granular, coarse, and therefore at times very porous mixtures. To this fact are due several drawbacks which are very objectionable in the use of the material as a tooth-cement. In consequence of the porosity a plugging for the teeth hardly offers a sufficient protection to the dentin situated behind the plugging against deleterious liquids and microbes contained in the mouth. The granular structure is moreover the mechanical cause of rapid wear, as the particles protruding above the surface are liable to be torn off in the act of chewing. Considered from an esthetic point of view this structure gives rise to the disadvantage of a blunted appearance. In consequence of the slight transparency of the cements heretofore used it is not feasible to obtain a permanently bright surface. Of course the surface, like that of every solid body, may be given an external luster by polishing; but this is not sufficiently deep to conceal a plugging of the kind in the tooth nor at all durable, as the surface soon becomes worn, and bodies which are not transparent have no luster of their own. In the case of pluggings for teeth attempts have been made to obtain a sufficiently deep and permanent luster by the addition of boric acid or by diluting the cement; but by this means the desired object was not accomplished, because the boric or phosphoric acid separating on the surface is rapidly washed away, thus destroying the luster.

By my aforesaid invention I succeed in producing a cement exhibiting a quartzy and vitreous structure, owing to which the above-mentioned disadvantages are obviated.

The material manufactured by the improved process gives a cement the texture of which is extremely close and which presents a quartzy fracture. The cement is not porous, it wears exceedingly little, and without being polished preserves its deep luster. In addition to these physical properties, which are entirely new in cements produced by the cold method, the cement made with the material obtained by my improved process has a peculiar chemical composition. It consists of beryllium compounds and double compounds of this and other light metals. A novel feature of this material is the mixture of beryllium salts with those of other light metals, beryllium salts not having hitherto become known as ingredients of cement powders, and also the composition of the finished cement, although use has been made of beryllium compounds as an addition to the acid in cements. This addition has, however, been so slight that it has not at all affected the composition of the finished cement, and has only had for its object to moderate the reaction between the acid and the powder. As regards their composition these cements did not in any way differ from the customary cements, whereas in the improved process the beryllium salts are the decisive factors in determining the properties and the composition of the hardened cement.

This process may, for example, be carried out as follows: An aqueous solution of beryllium nitrate is precipitated with a solution of silicic acid in soda-lye, ($Na_4SiO_4$.) The deposit formed, after having been left under water for some length of time, is filtered, washed, dried, and slightly calcined, then triturated and pulverized. The loose powder obtained, the composition of which corresponds to the formula $2BeO.SiO_2$, is intimately mixed, in the proportion of 8:5, with a finely-ground material produced by melting lime, aluminium oxid, and silicon anhydrid together in the molecular proportion of 1:1:2. This mixture triturated with phosphoric acids or their acid salts—use being made in the present case of an approximately fifty-per-cent solution of orthophosphoric acid in which aluminium phosphate is dissolved almost to saturation, with addition of a slight quantity of zinc phosphate—gives a plastic material which hardens in a short time. It is supposed that the reaction taking place in the hardening is due to the acid liquid withdrawing the lime from the lime compound, which can easily be decomposed by acids, and part of the beryllium oxid from the beryllium compound, with formation of mixed phosphates and hydration of the silicates left behind.

For carrying the process into effect use may be made of ortho, pyro, and metaphosphoric acids and their acid salts. The compounds of the light metals employed are especially those of the alkaline metals sodium, potassium, lithium, the metals of the alkaline earths calcium, strontium, and those of zinc and aluminium.

What I claim as my invention, and desire to secure by Letters Patent, is—

1. A process of manufacturing a material designed for the production of cement, consisting in mixing a beryllium compound, difficultly soluble in water and susceptible of being chemically changed by phosphoric acid, with a like compound of a light metal, including zinc, substantially as herein set forth.

2. A process of the character described, consisting in precipitating an aqueous solution of beryllium nitrate with a solution of silicic acid in soda-lye, and mixing the deposit with a finely-ground material produced by melting lime, aluminium and silicon anhydrid together, substantially as herein set forth.

3. As an article of manufacture, a material consisting of a beryllium compound and a like compound of a light metal, including zinc, substantially as herein set forth.

In testimony whereof I have signed my name to this specification in the presence of two subscribing witnesses.

PAUL STEENBOCK.

Witnesses:
HENRY HASPER,
WOLDEMAR HAUPT.